United States Patent [19]

Paus

[11] Patent Number: 4,554,838

[45] Date of Patent: Nov. 26, 1985

[54] FASTENER TESTER

[75] Inventor: Lloyd L. Paus, Tustin, Calif.

[73] Assignee: Huck Manufacturing Company, Irvine, Calif.

[21] Appl. No.: 576,120

[22] Filed: Feb. 2, 1984

[51] Int. Cl.[4] .............................................. G01N 3/08
[52] U.S. Cl. ........................................ 73/761; 73/834
[58] Field of Search ................. 73/761, 826, 831, 834, 73/837

[56] References Cited

U.S. PATENT DOCUMENTS 3,382,709 5/1968 Sorensen ................................ 73/761
3,429,179 2/1969 Bowen et al. ......................... 73/761

Primary Examiner—Anthony V. Ciarlante
Attorney, Agent, or Firm—Harness, Dickey & Pierce

[57] ABSTRACT

A fastener tester for testing fasteners for securing a plurality of workpieces together with such fasteners including a pin member having an elongated shank with the fastener tester including a pair of relatively movable members adapted to have a fastener installed thereto and operatively associated with a load cell whereby installation loads and final clamp load or preload can be measured and subsequently the same fastener can be subjected to a tensile test and the resultant tensile loads measured.

21 Claims, 3 Drawing Figures

FASTENER TESTER

SUMMARY BACKGROUND OF THE INVENTION

The present invention relates to apparatus for testing fasteners and more particularly to apparatus for simply and quickly testing the installation load, clamp load, tensile load and other characteristics of a fastener.

The present apparatus is directed towards the testing of fasteners such as swage type lockbolts, threaded fasteners, blind fasteners, rivets and the like which can be installed in various ways such as torque, pull or squeeze.

In designing and evaluating fastening systems it is desirable to determine the loads on the fastened joint such as the peak installation load and the retained clamp load or preload. It is also desirable to be able to determine the tensile load characteristics of the fastener, i.e. the axial or tension load at which the fastener fails. In the past it has been common to conduct some of the above tests separately on different fasteners and on different test equipment. Thus one group of a particular fastener design would be tested to determine clamp or preload. In the case of a swage type lockbolt this might involve slowly swaging the collar to a pin with a tensile/compression test machine; after determining the installation load, the collar would be cut off to free the equipment to test the next fastener. To determine the clamp or pre-load and the tension load characteristics of that particular fastener, another group of fasteners would be applied to test plates which would have a special sheet metal paddle between the plates. These test plates would then be slowly pulled apart under measured loads to determine when the interfaced sheet metal paddle could be moved with an imposed side load of a specified amount on an extended lever on the paddle. Pull apart load at the point of paddle movement is clamp load. Pull apart loads are then continued until fastener failure to define tensile capability.

General examples of various types of fasteners which can be tested with the noted fastener tester are illustrated in the patents to Huck U.S. Pat. No. 2,531,048 issued Nov. 21, 1950; Wing, U.S. Pat. No. 2,940,495 issued June 14, 1960; Orloff, U.S. Pat. No. 3,421,562 issued Jan. 14, 1969; Reynolds, U.S. Pat. No. 3,464,472 issued Sept. 2, 1969; Ruhl and Dixon, U.S. Pat. No. 4,250,733 issued Feb. 17, 1981; and Ruhl, U.S. Pat. No. RE30,445 issued Dec. 16, 1980.

In the present invention, the fastener tester can provide all of the above noted information on a single fastener with only one set up required. The result is a more rapid means of securing the values of installation clamp or preload and tension load characteristics and, because all loads are measured from the same fastener, the resultant information is more accurate and more comprehensive. Further, the method used previously to determine installation loads had to be done slowly to avoid over-swaging of a swaged collar type fastener. This is not fully representative of the true speed at which a collar is normally installed and would result in inaccurate and even misleading results. In addition, the paddle system for determining clamp or pre-load defined in various specifications can produce inaccurate results since it is dependent on such factors as frictional coefficients, flatness, plate bending and operator skill. The fastener tester described herein has none of these problems and hence provides more accurate test information.

As will be seen the fastener tester is versatile and has other test capabilities.

Therefore it is an object of the present invention to provide a new and unique fastener tester which can rapidly and readily provide indications of the magnitudes of installation load, final clamp load or preload and tension load characteristics of a fastener.

It is another general object to provide an improved fastener tester.

Other objects, features, and advantages of the present invention will become apparent from the subsequent description and the appended claims, taken in conjunction with the accompanying drawings, in which:

Figure 1:
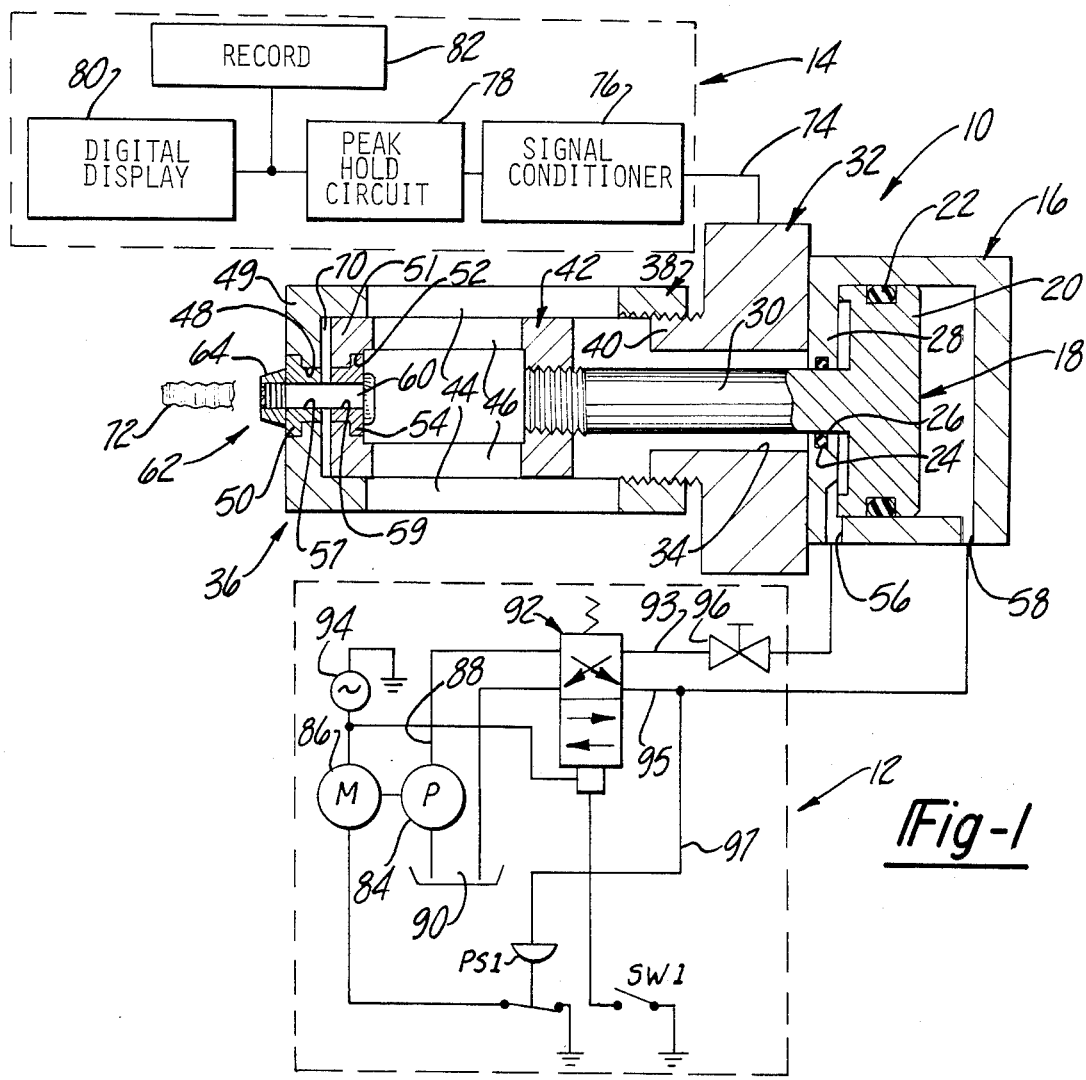
FIG. 1 is a partly schematic diagram of the fastener tester of the present invention with some components representatively shown in an elevational, sectional view.

Looking now to FIG. 1 the fastener tester includes a hydraulically actuated load cell assembly 10, a hydraulic power supply 12 and a signal display system 14, all of which are shown in schematic or representative form.

The load cell assembly 10 includes a cylinder 16 and a hydraulic piston 18 having a piston head 20 adapted to move reciprocably within the cylinder 16. An annular seal 22 carried by a groove in the piston head 20 provides a hydraulic seal between the piston head 20 and the confronting wall of the cylinder 16. Another annular seal 24 in a groove in a bore 26 in a front wall 28 of the cylinder 16 provides a seal for piston rod 30 which is connected with the piston head 20. Piston rod 30 extends outwardly from the cylinder 16 through the bore 26.

A load cell 32 is located adjacent to and is engageable with the front cylinder wall 28 and has a central bore 34 through which piston rod 30 extends in a clearance relationship. A fixture assembly 36 includes an outer tubular housing 38 threadably secured to an annular boss portion 40 on load cell 32; assembly 36 also includes an inner sleeve 42 threadably secured to the outer end of piston rod 30 for sliding, reciprocation within housing 38. The outer housing 38 and inner sleeve 42 have longitudinally extending through slots 44 and 46, respectively. Slots 44 and 46 are located in radial alignment for a purpose to be described. While a generally cylindrical 'housing' type structure is shown for outer housing 38 and inner sleeve 42, it should be apparent that other suitable constructions could be used.

The forward end of outer housing 38 terminates in an end plate portion 49 which has a stepped bore 48 with a hardened, tubular insert 50 matably supported therein. In similar fashion, the forward end of inner sleeve 42 terminates in an end portion 51 which has a stepped bore 52 with a hardened, tubular insert 54 matably supported therein. Openings 57 and 59 in inserts 50 and 54, respectively, are of the same diameter and are located in axial alignment.

The cylinder 16 has an inlet port 56 located at the forward rod end or pull side of cylinder 16 and a return port 58 located at the rearward piston head end or return side of the cylinder 16. Thus when hydraulic pressure is applied to the pull side of the cylinder 16 via port 56, the piston 18 and hence inner sleeve 42 will be moved rearwardly relative to the outer housing 38. On the other hand, upon the application of fluid pressure to the return side of cylinder 16 via port 58, the piston 18 and hence inner sleeve 42 will be moved forwardly relative to the outer housing 38.

Openings 57 and 59 are selected to be of a size to receive the shank of a pin member 60 of a two piece fastener 62. In the example shown in the drawing the two piece fastener 62 can be a lockbolt generally of the type shown in U.S. Pat. No. Re.30,445, reissued to Ruhl on Dec. 16, 1980. Thus fastener 62 is a pull type lockbolt (as exemplified by FIGS. 1, 7 and 8 of the noted Ruhl patent) and includes a collar 64 adapted to be swaged into lock grooves in pin 60. It will be apparent that the fastener tester 10 is also applicable to other pull type fasteners, i.e. blind fasteners, squeeze type installation fasteners, i.e. stump lockbolts and rivets and torque type installation fasteners i.e. threaded fasteners. In this regard, it should be noted that the access slots 44 and 46 also permit use of certain type of squeeze type installation tools for installing stumps.

In operation, fastener 62 is assembled to the sleeve 42 and outer housing 38 by inserting the pin 60 through openings 57 and 59. Access is provided via the aligned slots 44 and 46. The collar 64 is next located in a lock groove portion of pin 60 which extends outwardly from the bore 57 of outer housing insert 50. In this condition the end plate portion 51 of movable sleeve 42 is spaced from the confronting surace of end plate portion 49 of the stationary outer housing 38. The width of the resultant gap 70 can be selected to a desired dimension simply by threading the outer housing 38 more or less onto the threaded boss 40 on the load cell 32. The combined thickness of the sleeve insert 50, the gap 70, and the outer housing insert 54 is selected to represent a desired combined thickness of workpieces to be secured together by the fastener to be tested. Note then that this combined thickness (grip) can be easily varied and a series of tests conducted on a plurality of like fasteners for the entire range of thicknesses from a selected minimum to a selected maximum (grip range).

The fastener 62 is set by a pull tool (not shown) which can be generally of the type shown in the U.S. Pat. Nos. 3,329,000 issued to Schwab et al on July 4, 1967 and 3,363,211 issued to Chirco on Jan. 9, 1968. Thus the tool has jaws which grip a pull groove portion 72 of the pin 60 and a swaging anvil which engages the collar 64.

The tool applies a relative axial force between the pin 60 and collar 64 which urges the sleeve end plate portion 51 towards the housing end plate portion 49. However, the inner sleeve 42 and outer housing 38 are precluded from closing the gap 70 in the condition shown in FIG. 1 i.e. piston 18 bottomed out and cylinder front wall 28 engaging load cell 32. The load cell 32 is in effect clamped between the housing of cylinder 16 and the outer housing 38 and hence will receive the reactive forces responding to the axial loads applied between the housing 38 and sleeve 42. Thus, in this condition, the load cell 32 will provide an output signal having a magnitude which varies in accordance with variations in the relative axial force applied between the pin 60 and collar 64 and transmitted between plate portions 49 and 51.

The load cell 32 will transmit the output signal via line 74 to the signal display system 14 which will provide a reading of the magnitude of the installation load.

As the installation load increases in magnitude the collar 64 will be swaged into the lock grooves. Finally upon completion of swaging and upon a further increase in axial load the pull groove portion 72 will be fractured, completing the installation of the fastener 62.

The complete installation load cycle will be displayed via the signal display system 14. In one form, the display system 14 includes a signal conditioner 76, a peak hold circuit 78, a digital display 80 and a record device 82 all of which are components well known in the art. A Signal Conditioning Digital Indicator Peak Reading device, Model 3270P manufactured by Daytronic Corporation has been found to be satisfactory.

The signal conditioner 76 operates on the signal from the load cell 32 via line 74 to provide a signal in suitable form for the peak hold circuit 78, digital display 70 and record system 82. The digital display 80 provides an output indication of the instantaneous installation loads applied to the fastener 62. The peak hold circuit 78 records the peak load encountered during installation and displays it on the digital display 70. When the peak hold circuit 78 is released with a momentary switch, the digital display 70 will then show the real-time clamp or pre-load. The record device 82 can provide a complete display of the entire installation load cycle. This will include the noted peak load as well as the final clamp or pre-load retained in the fastened joint. As noted this is only a part of the significant test and evaluation information that can be secured by use of the tester on a single fastener.

It is also desirable to determine the behavior of the fastener 62 to tensile loads tending to axially pull the fastened workpieces apart. With the apparatus of FIG. 1, this would be simulated by urging the inner sleeve 42 rearwardly relative to the housing 38 i.e. to increase gap 70. This is accomplished by actuating the power supply 12 to apply fluid pressure to the pull side of the piston 18 via inlet port 56 to cylinder 16.

Now the load cell 32 provides a signal indicative of the magnitude of tensile force urging the collar 64 and pin 60 in a direction simulating the condition in which fastened workpieces are being pulled apart. Again the magnitude of this load can be observed and recorded via the display system 14. The tensile test continues until the fastener 62 ultimately fails. For a shear type fastener, i.e. designed mainly to resist shear loads imposed on fastened joint, failure usually occurs by stripping the swaged collar 64 from the pin 60; for tension type fasteners, i.e. designed mainly to resist tensile loads imposed on the fastened joint, failure usually occurs via a tensile failure of the pin 60. The maximum tensile failure load would be recorded on the peak hold circuit 78 and displayed on the digital display 70. The gap between sleeve 42 and the threaded boss portion 40, with the piston 18 bottomed out against wall 28 of cylinder 16, is always greater than the maximum stroke of piston 18 in cylinder 16 so that sleeve 42 cannot bottom out against boss portion 40 and give a false tensile peak reading.

After the fastener 62 has been fractured it is a simple matter to clear the fixture assembly 36, apply another fastener and repeat the test. Note that fasteners having pins of differnt diameters can easily be accommodated simply by removing the hardened inserts 50 and 54 and replacing them with inserts having openings corresponding to 57 and 59 but of a different size.

The hydraulic power supply 12 includes a fluid pump 84 driven by an electric motor 86 energized by an a-c source 94. Pump 84 has a high pressure outlet 88 and a low pressure return or tank 90. The outlet 88 and tank 90 are connected to the inlet port 56 and return port 58 via a hydraulic directional valve 92 and fluid lines 93 and 95. Valve 92, which is solenoid actuated, is normally urged to the condition shown in which pump outlet 88 is connected to the cylinder return port 58 via line 95 and the tank 90 is connected to the cylinder inlet port 56 via line 93. In this condition the piston 18 is in its forward postion (as shown in FIG. 1) in which a fastener 62 can be inserted and set as described; as noted, it is in this condition of tester 10 that the loads incurred in the installation cycle and the clamp or pre-load will be measured, displayed and recorded.

In order to determine the characteristics of the fastener 62 in response to tensile loading of a fastened joint, the solenoid actuated valve 92 is placed in its alternate condition. This is done by closing a ground switch SW1 completing a circuit from the a-c source 94 to the solenoid portion of valve 92. In this alternate condition the pressure outlet 88 is connected to the pull side of cylinder 16 via line 93 and inlet 56; at the same time the tank 90 is connected to the return side of cylinder 16 via line 95 and outlet port 58. A restriction valve 96 is located in line 93 and is selectively actuable to restrict the flow of fluid from the pressure outlet 88 of pump 84. In this way the rate of application of load on the fastener 62 in the tension test can be controlled and selectively varied.

A pressure sensitive switch PS1 is located in the ground circuit for drive motor 86. Switch PS1 is hydraulically connected to the return line 95 via line 97 such that when the valve 92 is in the return condition as shown in FIG. 1, i.e. return line 95 connected to the pressure outlet 88 of pump 84, the motor 86 will be de-energized upon attainment of a selected magnitude of pressure in line 95. This magnitude of pressure will occur when the piston 18 has bottomed out on its return stroke and hence the pressure switch PS1 precludes the attainment of further increases in fluid pressure which could cause damage in the fluid circuit.

Thus with the system and apparatus of FIG. 1, the same fastener can be tested within a single test apparatus for installation loads, clamp load (preload) and tensile loading.

Figure 2:
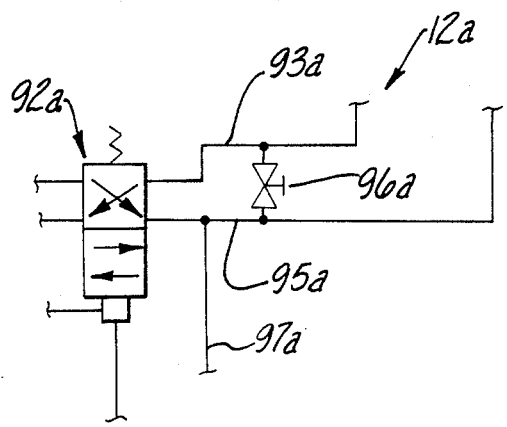
FIG. 2 is a view of a portion of the fastener tester of FIG. 1 modified to include an alternate form of load control.

In a modified form of the hydraulic power supply 12 the restriction valve 96 is replaced with a bypass valve located between the lines 93 and 95. The system of FIG. 2, except for the changes shown is the same as that of FIG. 1 and hence has only been partially shown. In FIG. 2, those components similar to like components in FIG. 1 have been given the same number designation with the addition of the letter postscript "a". Thus in FIG. 2 the power supply 12a includes a bypass valve 96a located between lines 93a and 95a from directional valve 92a. The reminder of the power supply 12a and associated components are the same as power supply 12 of FIG. 1. In the system of FIG. 2, the rate of pressure build up during the pull or tension cycle, i.e. high pressure to line 93a, can be selectively varied by regulating the amount of fluid bypassed from line 93a to line 95a via bypass, restriction valve 96a. In addition the circuit permits the fastener, such as 62, to be maintained under a selected tensile load for predetermined periods.

Figure 3:
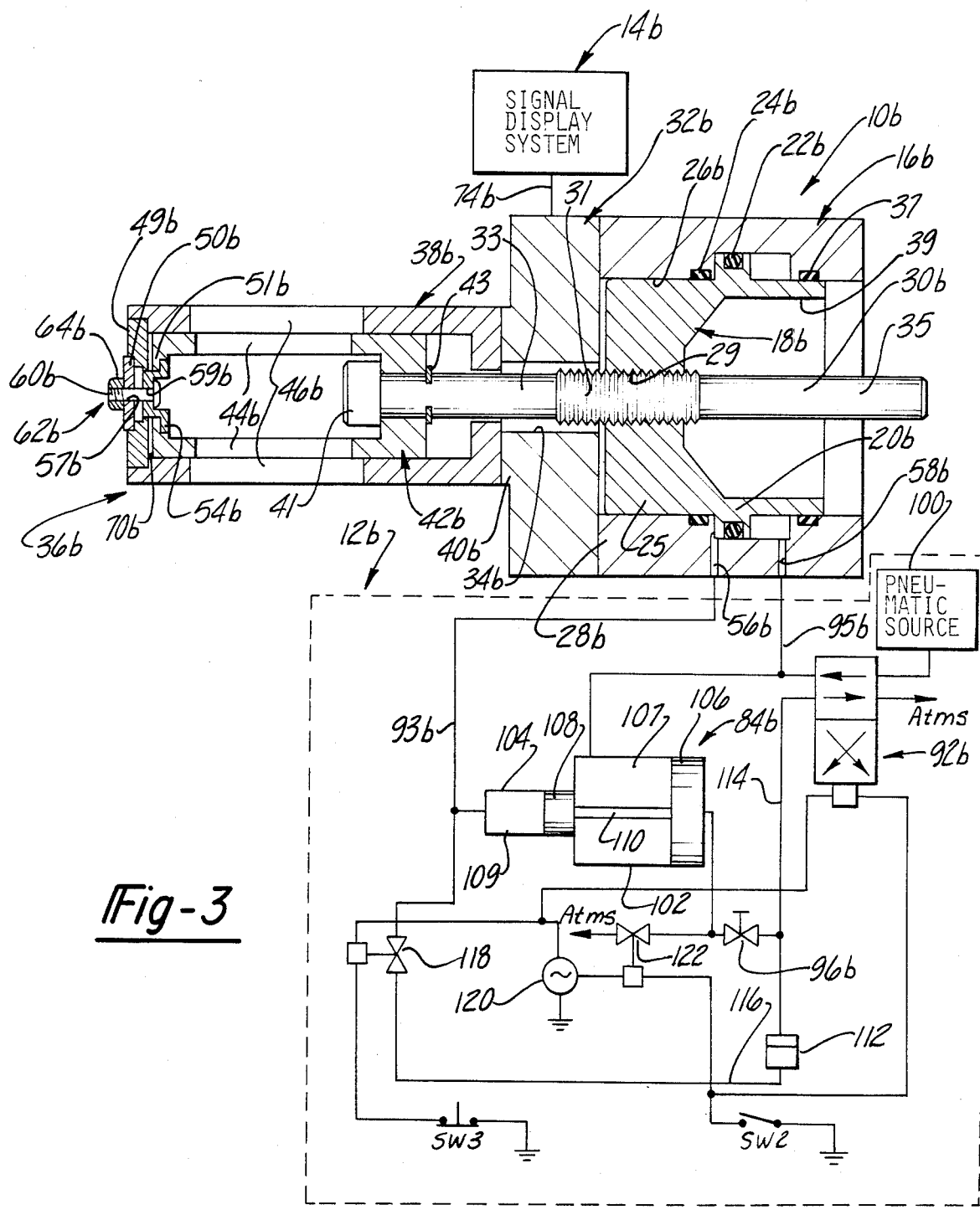
FIG. 3 is a partly schematic diagram of a modified form of the fastener tester of the present invention to provide an alternative means of providing hydraulic power and adjustment for fastener length with some components shown representatively in an elevational, sectional view.

A further modified system is shown in FIG. 3, where components similar to like components in FIG. 1 are given the same numerical designation with the addition of the letter postscript "b".

Looking now to FIG. 3 the fastener tester includes a pneumatically, hydraulically actuated load cell assembly 10b, a pneumatic-hydraulic power supply 12b and a signal display system 14b.

The load cell assembly 10b includes a cylinder 16b and a hydraulic piston and rod assembly 18b having a piston head 20b adapted to move reciprocably within the cylinder 16b. An annular seal 22b carried by a groove in the piston head 20b provides a hydraulic seal between the piston head 20b and the confronting wall of the cylinder 16b. Another annular seal 24b in a groove in a bore 26b through a front wall 28b of the cylinder 16b provides a seal for a reduced diameter portion 25 of piston head 20b. A piston rod 30b is threadably connected with the piston head 20b intermediate its ends via a threaded rod portion 31 which is connected to a threaded central bore 29 extending coaxially through the piston head 20b. Piston rod 30b has a forward portion 33 extending forwardly from the threaded rod portion 31 and a rearward portion 35 extending rearwardly from the piston head 20b and the cylinder 16b. Another annular seal 37 located in an annular groove in a rearward portion of the wall of cylinder 16b provides a fluid seal with a reduced diameter, rearwardly extending portion 39 of the piston head 20b.

A load cell 32b is located adjacent and is engageable with the front cylinder wall 28b and has a central bore 34b through which piston rod 30b extends. A fixture assembly 36b includes an outer tubular housing 38b adapted to engaged an annular boss portion 40b on load cell 32b and an inner sleeve 42b connected to the end of piston rod 30b for sliding, reciprocation within housing 38b. The piston rod 30b and sleeve 42b are connected via an enlarged diameter portion 41 at the end of rod 30b and a snap ring 43 located in a groove rearwardly of the portion 41. With this connection, the piston rod 30b can be rotated relative to the sleeve 42b. The outer housing 38b and sleeve 42b have longitudinally extending radially aligned through slots 44b and 46b, respectively.

The forward end of outer housing 38b terminates in a plate 49b having a counterbore with a hardened, tubular insert 50b matably supported therein. In similar fashion, the forward end of inner sleeve 42b terminates in a plate portion 51b has a stepped bore with a hardened, tubular insert 54b matably supported therein. Openings 57b and 59b in inserts 50b and 54b are of the same diameter and are located in axial alignment.

The cylinder 16b has an inlet port 56b located at the forward or pull end of the cavity of cylinder 16b and a return port 58b located at the rearward or return end of the cavity of cylinder 16b. Thus when hydraulic pressure is applied to the pull end of the cylinder 16b via port 56b, the piston 18b and hence inner sleeve 42b will be moved rearwardly relative to the outer housing 38b. On the other hand, upon the application of pneumatic pressure to the return end of cylinder 16b via port 58b, the piston 18b and hence inner sleeve 42b will be moved forwardly relative to the outer housing 38b.

The openings 57b and 59b in inserts 50b and 54b are selected to be of a size to receive the shank of a pin member 60b of a two piece fastener 62b. In the example shown in the drawing the two piece fastener 62b can be a threaded fastener and includes a nut 64b adapted to be threadably secured to the threaded end of pin 60b. The nut 64b can be of the torque limiting type shown in the Wing patent (supra). Of course, other types of threaded pin and nut constructions could be tested.

In operation, fastener 62b is assembled to the sleeve 42b and outer housing 38b by inserting the pin 60b through the openings in inserts 50b and 54b. Access is provided via the aligned slots 44b and 46b. The nut 64b is next threaded to pin 60b. In this condition the sleeve plate portion 51b is spaced from the confronting housing plate 49b. The width of the resultant gap 70b can be selected to a desired dimension simply by threading the piston rod 30b to move forwardly or rearwardly relative to piston head 20b (via the threaded connection of 29 and 31). This results in varying the position of the inner sleeve 42b relative to the outer housing 38b whereby gap 70b can be varied. In this way, a desired combined thickness of workpieces to be secured together by the fastener to be tested can be simulated. Note then that this simulated combined thickness (grip) can be easily varied and a series of tests conducted on a plurality of like fasteners for the entire range of thicknesses from a selected minimum to a selected maximum (grip range).

The fastener 62b can be installed to the fixture assembly 36b via a conventional torquing tool (not shown) adapted to apply a preselected magnitude of torque to the nut 64b. As the tool applies torque to the nut 64b, a relative axial force between the pin 60b and nut 64b results which urges the sleeve plate portion 51b towards the housing plate 49b. However, the inner sleeve 42b and outer housing 38b are precluded from closing the gap 70b in the condition shown in FIG. 3, i.e. piston 18b bottomed out and cylinder front wall 28b engaging load cell 32b. In this condition, the load cell 32b will provide an output signal having a magnitude which varies in accordance with variations in the relative axial force (and hence) torque) applied between the pin 60b and nut 64b. The load cell 32b will transmit the output signal via line 74b to the signal display system 14b which will provide a reading of the magnitude of the peak installation load and the clamp or pre-load in the same manner as signal display system 14 of FIG. 1.

It is also desirable to determine the behavior of the fastener 62b to tensile loads tending to pull the fastened workpieces apart. With the apparatus of FIG. 3, this is simulated by urging the inner sleeve 42b rearwardly relative to the housing 38b. This is accomplished by actuating the power supply 12b to apply fluid pressure to the pull side of the piston 18b via inlet port 56b to cylinder 16b.

The load cell 32b now provides a signal indicative of the magnitude of tensile force urging the nut 64b and pin 60b in a direction simulating the condition in which the fastened workpieces are being pulled apart. Against he magnitude of this load can be observed and recorded via the display system 14b. The tensile test continues until the fastener 62b ultimately fails.

After the fastener 62b has been fructured it is a simple matter to clear the fixture assembly 36b, apply another fastener and repeat the test. Note that fasteners having pins of different diameters can easily be accommodated simply by removing the hardened inserts 50b and 54b and replacing them with inserts having the appropriate sized openings.

The power supply 12b is adapted to operate from a pneumatic pressure source 100 and includes a pneumatically actuated hydraulic booster 84b. The booster 84b has a pneumatic piston-cylinder assembly 102 operatively connected with a hydraulic piston-cylinder assembly 104. In the latter structure, a pneumatic piston 106 in a cylinder 107 is connected to a hydraulic piston 108 in a cylinder 109 via a piston rod 110.

Hydraulic inlet port 56b is connected to the head end of the hydraulic cylinder 109 via line 93b. Pneumatic port 58b is connected to the rod end of the pneumatic cylidner 107 via line 95b. An air directional valve 92b controls the operation of the booster 84b and hence of the load cell assembly 10b. In the condition of directional valve 92b shown in FIG. 3, air pressure from pneumatic supply 100 is directed to the rod end of the pneumatic cylinder 107 and to the return side of cylinder 16b. At this time, the hydraulic fluid in the pull end of the cylinder 16b has been returned to the hydraulic cylinder 109 and the pressure is essentially at a low magnitude.

A hydraulic reservoir 112 has a pneumatic side connected to the directional valve 92b via line 114. A hydraulic side of reservoir 112 is connected to the inlet line 93b via line 116 through a normally opened valve 118. Valve 118 is solenoid actuated to its closed position when an associated electrical switch SW3 is closed completing an electrical circuit from an a-c source 120 to ground. As shown in FIG. 3, the system is in the return mode and SW3 is closed, closing the valve 118; at the same time the pneumatic line 114 is communicated to atmosphere (atms) via directional valve 92b. In this condition, fastener assembly 62b is assembled to the load cell assembly 10b as noted and the installation loads and clamp or pre-loads can be displayed and recorded. With either the swage type fastener in the embodiment of FIG. 1 or the threaded type fastener in FIG. 3 the final load reading after releasing the peak load hold device after installation will be indicative of the retained clamping force (or preload) of the fastener (62, 62b) on the fastened joint.

In order to determine the ultimate strength of the fastener 62b to loading in tension, the system is placed in the pull or tensile test mode. This occurs when air directional valve 92b is actuated to its alternate condition. The latter is achieved by closing an electrical switch SW2 which completes a circuit from a-c source 120 to the solenoid of valve 92b to ground. With valve 92b shifted, the pneumatic source 100 is connected to the head end of the pneumatic cylinder 107 of booster 84b thereby urging the pneumatic piston 106 and hence the hydraulic piston 108 to pressurize hydraulic fluid at the pull or inlet port 56b to urge the piston 20b rearwardly to apply a tensile load between the nut 64b and pin (or bolt) 60b. At this time the return side of cylinder 16b is connected to atmosphere via outlet 58b, line 95b and valve 92b. Similarly the rod or return side of the pneumatic cylinder 107 of booster 84b is connected to atmosphere via line 95b and valve 92b. The application of pressure and hence axial load of increasing magnitude continues until failure of the fastener 62b. The load on the pull cycle is indicated and recorded via the display system 14b. The rate of tensile load application to the fastener 62b can be selectively varied by varying the rate of pneumatic pressure build up via restriction valve 96b. Valve 96b is located in a line connecting line 114 to the head side of the pneumatic cylinder 107.

The volume of fluid available from cylinder 109 of hydraulic assembly 104 to cylinder 16b, while sufficient for tensile test purposes, is relatively small. In order to provide the necessary volume of hydraulic fluid to move the piston 20b rearwardly adequately to fully strip the nut 64b from the pin 60b, pressurized hydraulic fluid from the reservoir 112 is utilized. This is accomplished by opening switch SW3 to deenergize the solenoid for valve 118 whereby it will move to its normally opened condition. Since the pneumatic side of the reservoir 112 is pressurized from the air source 100 via line 114 and directional valve 92b, hydraulic fluid from the reservoir 112 will flow to cylinder 16b to effect the necessary movement of piston 20b to complete separation of nut 64b from pin 60b to facilitate removal of the expended fastener and insertion of a different fastener for the next test. Note that the reservoir 112 in this manner also assures that the hydraulic cylinder 109 will be fully charged with hydraulic fluid.

In order to place the system in the return mode the switch SW2 is opened shifting the air directional valve 92b to its return condition. In this condition pressurized air is applied to the return side of cylinder 16b and to the return side of the pneumatic cylinder 107 of assembly 102. The head side of the latter cylinder is connected to atmosphere via restrictor valve 96b, line 114 and direcitonal valve 92b. However, in order to more readily evacuate the air from the cylinder 107 a normally opened valve 122 connects the cylinder 107 directly and without significant restriction to atmosphere when switch SW2 is opened during return. Valve 122 is solenoid actuated to its closed condition via a-c source 120 when switch SW2 is closed. Note that in the return mode, the pneumatic side of reservoir 112 is now connected to atmosphere via directional valve 92b. Thus the hydraulic fluid from the pull side of the cylinder 16b is returned to hydraulic cylinder 109 of assembly 104 and to the reservoir 112. When the piston 20b has fully returned, the switch SW3 is closed actuating the reservoir valve 118 to its closed condition.

It has been found desirable that load cells 32 and 32b are of a shear type. One such cell found to be satisfactory is a Model 1220 manufactured and sold by Interface, Inc.

Thus the systems and apparatus of the present invention provide means for testing a fastener and determining the characteristic of its installation loads, its clamp load or preload and the characteristics of the same fastener in tensile loading. As previously indicted the systems and apparatus can be used to test different types to fasteners and is not restricted to the specific types which have been shown by way of example. At the same time various types of installation tools can be utilized in the conduct of the fastener tests i.e. pull type tools, squeeze type, torque type, etc. In this latter regard, it should be noted that the subject system and apparatus also provides an indication of certain characteristics of installation tools i.e. the nature of the installation load curve etc.

While it will be apparent that the preferred embodiment of the invention disclosed are well calculated to fulfill the objects above stated, it will be appreciated that the invention is susceptible to modification, variation and change without departing from the proper scope or fair meaning of the invention.

What is claimed is:

1. A fastener tester for testing fasteners for securing a plurality of workpieces together with such fasteners including a pin member having an elongated shank, said fastener tester comprising:
   a first housing member,
   a second housing member,
   said first and second housing members having first and second plate portions respectively, located at one end and adjacent to each other,
   said first and second plate portions having first and second fastener openings, respectively, axially aligned with each other along a preselected axis and adapted to receive the pin member,
   a load cell operativey connected to said first housing member,
   said first and second housing members adapted for relative movement along said axis,
   load means operatively connected to said second housing member and being selectively actuable for providing said relative movement whereby said adjacent plate portions can be move axially towards or away from each other,
   said load means connected to said load cell,
   adjustment means for selectively adjusting the distance between said first and second plate portions to simulate a desired grip increment for the fastener to be tested, said adjustment means providing movement of one of said first and second housing members relative to the other for adjusting the closest distance between said first and second plate portions to simulate said desired grip increment,
   said first and second housing members having first and second access openings, respectively, permitting internal access for locating the fastener pin member in said aligned fastener openings whereby the fastener can be installed to urge said first and second plate portions together,
   load transfer means for transferring the relative force between said first and second plate portions to said load cell whereby said load cell will provide a signal having a magnitude varying in accordance with variations in the magnitude of the installation load on the fastener urging said first and second plate portions together,
   said load means actuable to move said first and second plate portions away from each other whereby the installed fastener can be subject to tensile loading varying in magnitude,
   said load transfer means transferring the relative force between said first and second plate portions to said load cell whereby said load cell will provide a signal having a magnitude varying in accordance with variations in the magnitude of the tensile load applied to the fastener as said first and second plate portions are urged to move away from each other.

2. The fastener of claim 1 with said adjustment means including a threaded connection between said first housing member and said load cell with said threaded connection between selectively actuable for adjusting the closest distance between said first and second plate portions to simulate said desired grip increment.

3. The fastener tester of claim 1 with said load means comprising a piston and cylinder with said piston having a piston rod connected to said second housing member, said adjustment means including a threaded connection between said piston and said second housing member for adjusting the closest distance between said first and second plate portions to simulate said desired grip increment.

4. The fastener tester of claim 1 with said load means including control means selectively operable for varying the rate of application of load urging said adjacent plate portions away from each other.

5. The fastener tester of claim 4 with said control means selectively operable for holding to a preselected magnitude the load urging said adjacent plate portions away from each other.

6. The fastener tester of claim 1 further including first and second insert means supported in said first and second plate portions and defining said first and second fastener openings, said first and second insert means being removable from said first and second plate portions whereby different insert means with different sized fastener openings can be substituted for said first and second insert means to accommodate different sized fasteners.

7. The fastener tester of claim 1 with said load means including a fluid actuated piston and cylinder, said piston including a piston rod connected to one of said first and second housing members to effectuate said relative movement between adjacent plate portions, said cylinder having a pull side and a return side with said piston being urged to move said plate portions apart when fluid pressure is applied to said pull side and to move said plate portions towards each other when fluid pressure is applied to said return side, and further comprising fluid power supply means for providing fluid pressure selectively to said pull side and said return side of said cylinder, pressure control means connected between said cylinder and said fluid power supply means for selectively controlling the magnitude of fluid pressure to said cylinder.

8. The fastener tester of claim 7 with said pressure control means serially located in a fluid conduit from said fluid power supply' means to said pull side of said cylinder.

9. The fastener tester of claim 7 with said pressure control means located in a fluid conduit in a shunt relationship between said pull side and said return side of said cylinder.

10. The fastener tester of claim 7 with said fluid power supply means including a hydraulic pump having a pressure outlet and a return inlet, a hydraulic directional valve, and conduit means connecting said pressure outlet and said return inlet to said pull side and return side of said cylinder through said directional valve, shifting means actuable to place said directional valve in a first condition for connecting said pump outlet to said pull side of said cylinder and said pump return inlet to said return side of said cylinder and to a second condition for connecting said pump outlet to said return side of said cylinder and said pump return inlet to said pull side of said cylinder.

11. The fastener tester of claim 7 with said fluid power supply means including a hydraulic booster means, said booster means comprising a hydraulic piston and cylinder and a pneumatic piston and cylinder with said hydraulic and pneumatic pistons being operatively connected, said pneumatic piston being actuable from a source of pneumatic pressure connected to said pneumatic cylinder to move said hydraulic piston to pressurize hydraulic fluid in said hydraulic cylinder, hydraulic conduit means connecting said hydraulic cylinder to said pull side of said load means cylinder, an air directional valve, pneumatic conduit means connecting said pneumatic cylinder and said return side of said load means cylinder to the pneumatic source via said air directional valve, said directional valve being selectively actuable to a first condition for communicating pressure from the pneumatic source to said return side of said load means cylinder and to one side of said pneumatic cylinder for urging said pneumatic piston to a return position relieving hydraulic pressure in said hydraulic cylinder and to a second condition for communicating pressure from the pneumatic source to the opposite side of said pneumatic cylinder for urging said hydraulic piston to pressurize hydraulic fluid to said pull side of said load means cylinder, said directional valve in said second condition communicating said return side of said load means cylinder and said one side of said pneumatic cylinder to atmosphere.

12. The fastener tester of claim 11 further comprising a hydraulic reservoir, said reservoir including pressure means for pressuring said reservoir in response to air pressure from the pneumatic source, said pneumatic conduit means communicating said pressure means to said pneumatic source when said air directional valve is in said first condition and to atmosphere when said air directional valve is in said second condition, said hydraulic conduit means connecting said reservoir to said hydraulic cylinder and to said pull side of said load means cylinder, a hydraulic valve means located in said hydraulic conduit means from said reservoir to said hydraulic cylinder and to said pull side of said load means cylinder and being selectively actuable between closed and open conditions to open or close the fluid path from said reservoir.

13. A fastener tester for testing fasteners for securing a plurality of workpieces together with such fasteners including a pin member having an elongated shank, said fastener tester comprising:
a first member,
a second member,
said first and second members having first and second plate portions, respectively, located at one end and adjacent to each other,
said first and second plate portions having first and second fastener openings, respectively, axially aligned with each other along a preselected axis and adapted to receive the pin member,
a load cell having a generally annular configuration with a central opening along said preselected axis and connected at one side to said first member,
said first and second members adapted for relative movement along said axis,
load means operatively connected to said second member and being selectively actuable for providing said relative movement whereby said adjacent plate portions can be moved axially towards or away from each other,
said load means including a piston and cylinder with said piston including a piston rod located along said axis and extending through said central opening of said load cell and connected to said second member and with said cylinder operatively connected to the opposite side of said load cell,
adjustment means for selectively adjusting the distance between said first and second plate portions to simulate a desired grip increment for the fastener to be tested,
said first and second members having aligned openings on at least one side with said openings extending longitudinally from a position around said first and second plate portions to a position proximate the opposite end of said first and second members thereby pemitting access for locating the fastener pin member in said aligned fastener openings whereby the fastener can be installed to urge said first and second plate portions together, load transfer means for transferring the relative force between said first and second plate portions to said load cell via the connection with said first and second members whereby said load cell will provide a signal having a magnitude varying in accordance with variations in the magnitude of the installation load on the fastener urging said first and second plate portions together, said load means actuable to move said first and second plate portions away from each other whereby the installed fastener can be subject to tensile loading varying in magnitude, said load transfer means transferring the relative force between said first and second plate portions to said load cell via the connection with said first and second members whereby said load cell will provide a signal having a magnitude varying in accordance with variations in the magnitude of the tensile load applied to the fastener as said first and second plate portions are urged to move away from each other.

14. The fastener tester of claim 13 with said adjustment means providing movement of one of said first and second members relative to the other for setting a gap of preselected width between said first and second plate portions to simulate said desired grip increment.

15. The fastener of claim 13 with said second member being generally located within and supported by said first member for relative sliding motion, said adjustment means including a threaded connection between said first member and said load cell with said threaded connection being selectively actuable for setting a gap of a preselected width between said first and second plate portions to simulate said desired grip increment.

16. The fastener tester of claim 13 with said second member being generally located within and supported by said first member for relative sliding motion, said adjustment means including a threaded connection between said piston and said second member for setting a gap of a preselected width between said first and second plate portions to simulate said desired grip increment.

17. The fastener tester of claim 16 with said threaded connection being provided between said piston rod and the remainder of said piston.

18. The fastener tester of claim 17 with said piston rod being rotatable relative to said second member.

19. The fastener tester of claim 13 further including first and second insert means supported in said first and second plate portions and defining said first and second fastener openings, said first and second insert means being removable from said first and second plate portions whereby different insert means with different sized fastener openings can be substituted for said first and second insert means to accommodate different sized fasteners.

20. A fastener tester for testing fasteners for securing a plurality of workpieces together with such fasteners including a pin member having an elongated shank, said fastener testing comprising:
a first housing member,
a second housing member,
said first and second housing members having first and second plate portions respectively, located at one end and adjacent to each other,
said first and second plate portions having first and second fastener openings, respectively, axially aligned with each other along a preselected axis and adapted to receive the pin member,
a load cell operatively connected to said first housing member,
said first and second housing members adapted for relative movement along said axis,
load means operatively connected to said second housing member and being selectively actuable for providing said relative movement whereby said adjacent plate portions can be moved axially towards or away from each other,
said load means including means for connecting said first housing member to said load cell,
said load means comprising a piston and cylinder with said piston having a piston rod connected to said second housing member and with said cylinder being operable to apply a compressive force against said load cell relative to said first housing member,
adjustment means for selectively adjusting the distance between said first and second plate portions to simulate a desired grip increment for the fastener to be tested,
said first and second housing members having first and second access openings, respectively, permitting internal access for locating the fastener pin member in said aligned fastener openings whereby the fastener can be installed to urge said first and second plate portions together,
load transfer means operable through said first housing portion, said piston head and said cylinder to apply said compressive force against said load cell for transferring the relative force between said first and second plate portions to said load cell whereby said load cell will provide a signal having a magnitude varying in accordance with variations in the magnitude of the installation load on the fastener urging said first and second plate portions together.
said load means actuable in response to fluid pressure in said cylinder and operable on said piston to move said first and second plate portions away from each other whereby the installed fastener can be subject to tensile loading varying in magnitude,
said load transfer means operable from said fluid pressure and through said cylinder against said load cell to apply said compressive force against said load cell for transferring the relative force between said first and second plate portions to said load cell whereby said load cell will provide a signal having a magnitude varying in accordance with variations in the magnitude of the tensile load applied to the fastener as said first and second plate portions are urged to move away from each other,
display means connected to said load cell and being selectively operable for providing visual indications of load in response to signals from said load cell.

21. The fastener tester of claim 20 with said display means selectively providing an indication of the peak load between said first and second plate portions via the fastener.

* * * * *

UNITED STATES PATENT AND TRADEMARK OFFICE
CERTIFICATE OF CORRECTION

PATENT NO. : 4,554,838
DATED : November 26, 1985
INVENTOR(S) : Lloyd L. Paus

It is certified that error appears in the above-identified patent and that said Letters Patent is hereby corrected as shown below:

Column 5, line 60, delete "reminder" and substitute therefor --remainder--.
Column 7, line 38, after "hence" delete --)--.
Column 7, line 59, delete "fructured" and substitute therefor --fractured--.
Column 8, line 9, delete "cylidner" and substitute therefor --cylinder--.
Column 9, line 45, delete "indicted" and substitute therefor --indicated--.
Column 10, line 15, Claim 1, delete "move" and substitute therefor --moved--.
Column 10, line 54, Claim 2, delete "between" and substitute therefor --being--.
Column 11, line 32, Claim 8, delete "supply'" and substitute therefor --supply--.

Signed and Sealed this

Eighteenth Day of March 1986

[SEAL]

Attest:

DONALD J. QUIGG

Attesting Officer

Commissioner of Patents and Trademarks